United States Patent
Yamaguchi et al.

Patent Number: 6,010,787
Date of Patent: Jan. 4, 2000

[54] GLASS COMPOSITIONS FOR CORE/CLADDING TYPE DISTRIBUTED INDEX OPTICAL ELEMENT

[75] Inventors: Jun Yamaguchi; Kiyosumi Fujii; Shigeo Kittaka, all of Osaka, Japan

[73] Assignee: Nippon Sheet Glass Co., Ltd., Osaka, Japan

[21] Appl. No.: 08/963,959

[22] Filed: Nov. 4, 1997

[30] Foreign Application Priority Data

Nov. 6, 1996 [JP] Japan ..................... 8-308617

[51] Int. Cl.$^7$ .................. D02G 3/00; G02B 6/02; B01D 21/26

[52] U.S. Cl. ............. 428/373; 428/426; 428/428; 385/123; 385/126; 359/341; 65/405

[58] Field of Search ................ 428/432, 701, 428/426, 373, 428; 65/385, 405; 501/32, 55, 60, 64, 72, 138, 37; 385/123, 126; 359/341

[56] References Cited

U.S. PATENT DOCUMENTS

| | | | |
|---|---|---|---|
| 3,784,386 | 1/1974 | Arujo et al. | 106/50 |
| 3,841,882 | 10/1974 | Wolf | 106/50 |
| 3,858,964 | 1/1975 | Piesslinger et al. | 350/96 |
| 4,439,008 | 3/1984 | Joormann et al. | 350/96.31 |
| 4,452,508 | 6/1984 | Beales et al. | 350/96.31 |
| 4,812,423 | 3/1989 | Kodoma et al. | 501/55 |
| 5,308,803 | 5/1994 | Clifford et al. | 501/17 |

FOREIGN PATENT DOCUMENTS

| | | |
|---|---|---|
| 0 068 580 | 1/1983 | European Pat. Off. |
| 0 098 648 | 1/1984 | European Pat. Off. |
| 63-064941 | 3/1988 | Japan |
| 63-144145 | 6/1988 | Japan |
| 63-170247 | 7/1988 | Japan |
| 64-76931 | 3/1989 | Japan |
| 3-107807 | 5/1991 | Japan |
| 3-259106 | 11/1991 | Japan |
| 8-211255 | 8/1996 | Japan |

OTHER PUBLICATIONS

International Search Report, May 7, 1997.
EPO Search Report, Feb. 18, 1998.

*Primary Examiner*—Timothy Speer
*Assistant Examiner*—Stephen Stein
*Attorney, Agent, or Firm*—Ratner & Prestia

[57] ABSTRACT

Glass compositions for a core/cladding type distributed-index optical element produced by a thermal-interdiffusion process using a double crucible is provided. The glass compositions comprises a glass composition for core containing 18 mol %<$Li_2O$≦30 mol %, 0 mol %≦$Na_2O$≦12 mol %, 0 mol %≦$PbO$≦5 mol %, 8 mol %≦$MgO$≦18 mol %, 0.5 mol %≦$BaO$≦5 mol %, 1 mol %≦$TiO_2$≦10 mol %, and 40 mol %≦$SiO_2$≦65 mol % as major components, where 18 mol %<($Li_2O+Na_2O$)≦30 mol %, 50 mol %≦($SiO_2+TiO_2$)≦66 mol %, and 8 mol %≦($MgO+PbO$)≦22 mol %; and comprises a glass composition for cladding containing 18 mol %<$R_2O$≦30 mol %($R_2O$=$Na_2O+K_2O$), 0 mol %≦$PbO$≦5 mol %, 8 mol % ≦$MgO$≦18 mol %, 0.5 mol %≦$BaO$≦5 mol %, 1 mol %≦$TiO_2$≦10 mol %, and 40 mol %≦$SiO_2$≦65 mol % as major components, where 50 mol % ≦($SiO_2+TiO_2$)≦66 mol %, and 8 mol %≦($MgO+PbO$)≦22 mol %.

9 Claims, 4 Drawing Sheets

GLASS COMPOSITIONS FOR CORE/CLADDING TYPE DISTRIBUTED INDEX OPTICAL ELEMENT

BACKGROUND OF THE INVENTION

FIELD OF THE INVENTION

The present invention relates to a glass composition suitable for producing a distributed-index optical element having a refractive index distributed in a radial direction by a thermal-interdiffusion process using a double crucible, and a distributed-index optical element made by said glass composition.

DESCRIPTION OF THE PRIOR ART

A distributed-index optical element having a parabolically varied refractive index distribution across its cross section has been broadly used for e.g., optical heads in a copy machine, an optical printer, a facsimile or the like, since the distributed-index optical element has a mechanism of image formation like a spherical lens even if the end surface of the element is flat and advantages such that a lens having smaller diameter and shorter focal length can be produced.

Conventionally, there have been three kinds of glass, i.e., thallium glass, cesium glass and lithium glass as glass materials used for a distributed-index optical element (e.g., a rod lens) produced by fiber forming and subsequent ion-exchange in molten-salt.

Thallium glass allows a distributed-index rod lens to have a very large acceptance angle due to its large electronic polarization, on the contrary a chromatic aberration of the rod lens made by thallium glass becomes large so that such rod lens can not be used for a color optical system.

Contrary to thallium glass, cesium glass can make a chromatic aberration of the rod lens made thereby small, but such rod lens can only have a small difference in refractive indices because it is impossible to contain a large quantity of cesium in the glass. In addition to this, the melting temperature of cesium glass is quite high. Cesium glass further has economical disadvantages such that it is very high cost.

Different from these thallium glass and cesium glass, lithium glass allows the rod lens made thereby to have a suitable difference in refractive indices and a quite small chromatic aberration, so that it is very useful glass for a high performance distributed-index rod lens in respect of optical quality. The melting temperature of lithium glass is also suitable for fiber-forming. However, lithium glass tends to be devitrified, so that a caution is required for the fiber forming step.

As to the method of forming a base glass fiber for the distributed-index rod lens while inhibiting the devitrification of glass, Japanese Patent Publication No.5-72337 proposes such technique that the outer surface of high devitrijying lithium glass core is covered by low devitrifying glass. According to this method, a refractive index distribution is provided to the base glass fiber by an ion-exchange process after the fiber-forming and cutting processes.

The compositions for lithium glass are known in the following references, for example.

Japanese Patent Publication No.63-64941 discloses the glass composition suitable for providing a refractive index distribution by ion exchange, i.e., the glass composition in which $SiO_2$, $TiO_2$ and MgO as major components and $Li_2O$ and $Na_2O$ as alkaline components are mixed, the maximum concentration of $Li_2O$ being 15 mol %.

Japanese Patent Publication No.59-49134 discloses the glass composition comprising $SiO_2$, $TiO2$, $MgO+PbO$, $Li_2O$ and $Na_2O$ as major components, the maximum concentration of $Li_2O$ being 18 mol %.

The reference "Soviet J.Glass Phy. & Chem. 1979, vol.5, p207" discloses the combination of alkali ions for contributing to a large difference in refractive indices is discussed and that the combination of lithium and sodium is desirable. This reference further discusses the devitrification and the chemical stability (or durability) of lithium glass, and shows the glass composition comprising 40 mol % of $SiO_2$, 20 mol % of $B_2O_3$, 6.5 mol % of $Al_2O_3$, 25 mol % of $Li_2O$, 5 mol % of $Na_2O$ and 3.5 mol % of $ZrO_2$.

The following references discloses the glass compositions which contain a large quantity of lithium.

The reference "J. Am. Ceram. Soc., 1969, vol.52, p169" discloses the glass composition comprising 75.0 mol % of $SiO_2$ and 25 mol % of $Li_2O$, and the glass composition in which a part of $Li_2O$ of said composition is substituted by $Na_2O$, $K_2O$ or $Cs_2O$.

The reference "J. Am. Ceram. Soc., 1972, vol.55, p254" discloses the glass composition comprising 50.0 mol % of $SiO_2$, 25.0 mol % of $Al_2O_3$ and 25.0 mol % of $Li_2O$.

The reference "J.Non-Crystalline Solids, 1980, vol.38, p705" discloses the glass composition comprising 74 mol % of $SiO_2$, 25 mol % of $Li_2O$ and 1 mol % of $P_2O_5$.

The reference "ICG, 1980, vol.12, p385" discloses the glass compositions comprising 65.0 mol % of $SiO_2$, 4.5 mol % of $B_2O_3$, 12.5 mol % of $Al_2O_3$ and 18.0 mol % of $Li_2O$; and 60.0 mol % of $SiO_2$, 10.0 mol % of $Al_2O_3$ and 30.0 mol % of $Li_2O$.

The reference "J.Material Science, 1983, vol.18, p1049" discloses the glass composition comprising 66.75 mol % of $SiO_2$, 23.45 mol % of $Li_2O$, 1.00 mol % of $K_2O$, 8.00 mol % of $ZnO$ and 0.80 mol % of $P_2O_5$.

The reference "J. Am. Ceram. Soc.,1984, vol.67, p270" discloses the glass compositions comprising 76.9 mol % of $SiO_2$ and 23.1 mol % of $Li_2O$; 71.4 mol % of $SiO_2$ and 28.6 mol % of $Li_2O$; 50 mol % of $SiO_2$, 20 mol % of $Al_2O_3$ and 20 mol % of $Li_2O$; 50 mol % of $SiO_2$, 25 mol % of $Al_2O_3$ and 25 mol % of $Li_2O$; 72.5 mol % of $SiO_2$, 7.25 mol % of $Al_2O_3$ and 20.25 mol % of $Li_2O$; 69.4 mol % of $SiO_2$, 6.95 mol % of $Al_2O_3$ and 23.65 mol % of $Li_2O$; 66.7 mol % of $SiO_2$, 6.65 mol % of $Al_2O_3$ and 26.65 mol % of $Li_2O$; and 64.1 mol % of $SiO_2$, 6.4 mol % of $Al_2O_3$ and 29.5 mol % of $Li_2O$.

As methods for fabricating a distributed-index rod lens by process other than ion-exchange, a number of methods are known in which a refractive index distribution is providers by thermal-interdiffusion between core glass and cladding crlass using a double crucible (for example, Japanese Patent Publications 47-824, 47-26983, 49-48774 and 62-21737).

According to the thermal-interdiffusion process, using a double crucible having coxal nozzles, two kinds of Grlass for core and cladding are poured into the double crucible and heated therein. The resultant two kinds of molten glass axe pulled from the coxal nozzles of the double crucible. The molten glass for core from the inner crucible and the molten glass for cladding from the outer crucible are contacted to each other at a high temperature in order to exchange positive ions constituting modifying oxide in the glass for core with positive ions constituting modifying oxide in the glass for cladding. As a result, a refractive index distribution is formed in a core/cladding type base glass fiber, which is continuously varying in a radial direction of the base glass fiber. Distributed-index rod lenses can be obtained by cutting the base glass fiber to a suitable length. Consequently, the method by the thermal-interdiffusion process has advantages such that the distributed-index rod lenses may be continuously manufactured in a short time.

Figure 1:
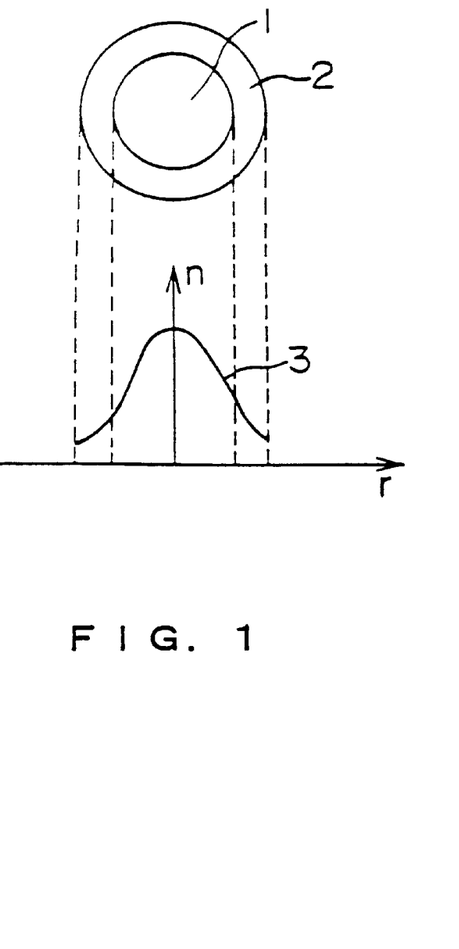
FIG. 1 shows a refractive index distribution curve of a distributed-index lens.

The profile refractive index distribution of the distributed-index rod lens of core/cladding type, is shown in FIG. 1 in which the upper part designates the cross-section of the rod lens, and the lower part the refractive index distribution curve wherein the abscissa is a refractive index n and the ordinate a distance r from the center of the rod lens. In the figure, the reference numeral 1 designates core glass and the reference numeral 2 cladding glass. The distribution curve 3 shows that the refractive index are varying in a radial direction and the center of core glass 1 has the maximum refractive index n. The refractive index distribution in the core glass 1 shows a parabolic cure, while that in the cladding glass 2 shows the distribution out of the parabolic curve.

In this description, forming a refractive index distribution by thermal-interdiffusion of ions between two kinds of high viscous fluid in contact is referred to as a thermal-interdiffusion process, and forming a refractive index distribution by ion-exchange between solid and liquid (i.e., molten salt) is referred to as an ion-exchange process. Forming a refractive index distribution by immersing a core/cladding type glass rod in molten salt is also referred to as an ion-exchange process.

According to the method described in said Japanese Patent Publication No.5-72337, the thickness of low devitrifying glass covering the core glass is required to be as thin as possible in order to implement the ion-exchange to the core glass. If the thickness of the low devitrifying glass is too thick in order to suppress the devitrification of the core glass, the distributed-index rod lens obtained can not have good optical characteristics. If the thickness of the low devitrifying glass is too thin in order to proceed successfully the ion-exchange process, it may be impossible to inhibit the devitrification of glass. Therefore, when the base glass fiber is forming while covering the outer surface of the high devitrifying lithium glass with the low devitrifying glass, the concentration of $Li_2O$ in the glass is up to 15 mol % and the acceptance angle of the rod lens obtained is at most 15.3 degrees.

Figure 2:
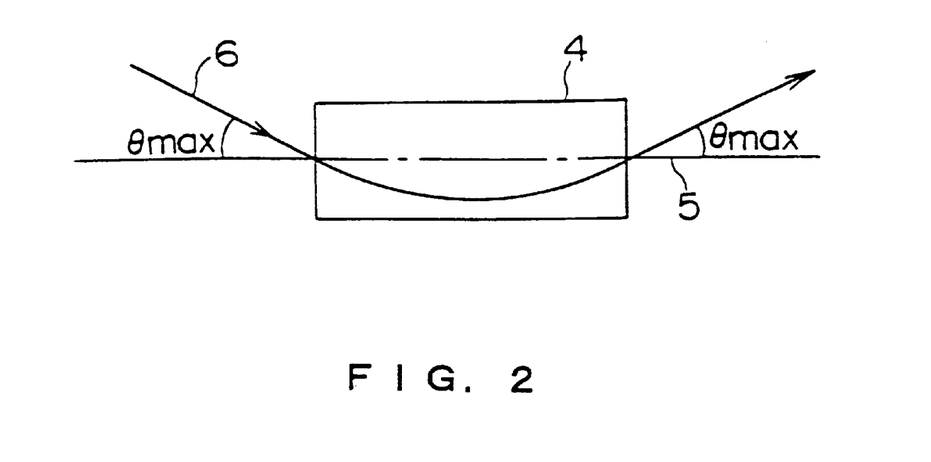
FIG. 2 shows an acceptance angle of a distributed-index lens.

It should be noted that as shown in FIG. 2, "acceptance angle" means the allowable maximum incident angle $\theta_{max}$ of a light beam 6 with respect to the central axis 5 of the distributed-index rod lens 4, in which $\sin\theta_{max} = \sqrt{A} \cdot n_0 \cdot r_0$ where $\sqrt{A}$ is a diffractive index distribution constant, $n_0$ is a refractive index on the central axis and $r_0$ is a radius of the part which can be utilized as a lens.

The method for producing a distributed-index rod lens using an ion-exchange process has a problem such that it takes a lot of time to product the rod lens, because a base glass fiber is formed and cut to a suitable length, and then the cut base glass fiber is exposed to an ion-exchange process. Further, the ion-exchange process is a batch processing, then the length of rod lens to be produced is limited.

On the contrary, in the method for producing a distributed-index rod lens using an thermal-interdiffusion prociess, a double crucible may be used so that the continuous fiber-forming is possible in the condition that the glass materials for core and cladding are continuously applied, resulting in no limitation for the length of rod lens to be produced. Accordingly, not only a distributed-index rod lens but also a long distributed-index fiber may be produced.

The thermal-interdiffusion process has been conventionally known technique and this process has often been applied to thallium glass. However, the cases are less in which lithium glass was fiber-formed in fact by means of the thermal-interdiffusion process. While the inventors of this patent application have known the distributed-index rod lenses described in Japanese Patent Publication No. 52-121333 and 52-124013, the $Li_2O$ concentration in glass in each rod lens disclosed in these Publications is less than or equal to 11.3 mol %, resulting in a small acceptance angle.

SUMMARY OF THE INVENTION

The object of the present invention is to provide a glass composition suitable for core/cladding structure used for a distributed-index optical element having a small chromatic aberration and a large acceptance angle.

Another object of the present invention is to provide a distributed-index optical element made from said glass composition.

Still another object of the present invention is to provide a method for producing a distributed-index optical element using said glass composition.

The present invention provides glass compositions for a core/cladding type distributed-index optical element produced by a thermal-interdiffusion process using a double crucible. The glass compositions comprises a glass composition for core containing 18 mol %<$Li_2O$≦30 mol %, 0 mol %≦$Na_2O$≦12 mol %, 0 mol %≦$PbO$≦5 mol %, 8 mol %≦$MgO$≦18 mol %, 0.5 mol %≦$BaO$≦5 mol %, 1 mol %≦$TiO_2$≦10 mol %, and 40 mol %≦$SiO_2$≦65 mol % as major components, where 18 mol %≦($Li_2O+Na_2O$)≦30 mol %, 50 mol %≦($SiO_2+TiO_2$)≦66 mol % and 8 mol %≦($MgO+PbO$)≦22 mol %; and comprises a glass composition for cladding containing 18 mol %<$R_2O$≦30 mol %($R_2O=Na_2O+K_2O$), 0 mol %≦$PbO$≦5 mol %, 8 mol %≦$MgO$≦18 mol %, 0.5 mol %≦$BaO$≦5 mol %, 1 mol %≦$TiO_2$≦10 mol %, and 40 mol %≦$SiO_2$≦65 mol % as major components, where 50 mol % ≦($SiO_2+TiO_2$)≦66 mol %, and 8 mol %≦($MgO+PbO$)≦22 mol %.

According to the present invention, the concentration of $Li_2O$ for core glass may be as high as in the rancre of 18 mol % <$Li_2O$≦30 mol %, so that it is possible to produce a distributed-index rod lens having a large acceptance angle up to 25.3 degrees. The distributed-index rod lens produced by a thermal-interdiffusion process using a double crucible has core glass and cladding glass which covers the core glass concentrically. This rod lens has the same structure as that of the rod lens described in said Japanese Patent Publication No.5-72337. According to the thermal-interdiffusion process which is different from the ion-exchange process, the thickness of the cladding glass is not limited during the process. Therefore, it becomes possible to produce the distributed-index rod lens having core glass composition containing $Li_2O$ (tends to be devitrified) of 18 mol %<$Li_2O$≦30 mol % by controlling the thickness of the cladding glass depending upon the devitrification of the glass.

According to the ion-exchange process, if the ratio of the concentration of $Li_2O$ versus that of $Na_2O$ doeis not have particular values e.g., from 1.2 to 1.6, the optical characteristics of the distributed-index rod lens is degraded (see Japanese Patent Laid-open No.63-64941). On the contrary, it has found that a core/cladding type distributed-index rod lens of the present invention may have good optical characteristics, even if said ratio of $Li_2O$ concentration versus $Na_2O$ concentration in the core glass is not in the range of said particular values. It has also found that causing $Na_2O$ to contain in the core glass is desirable, but the quality of the rod lens may be attained to some degree so long as the formed images by the rod lens are evaluated, even if no $Na_2O$ is contained in the core glass.

The concentration of all the alkali metals ($Li_2O+Na_2O+K_2O$) in the glass have a large effect on the chemical durability of glass. In accordance with the present intzention, $Li_2O$ concentration in the core glass can be controlled independent of $Na_2O$ concentration, so that all the alkali metals can be assigned to lithium to produce the distributed-index rod lens. In this case, it is preferred that the glass composition containing $Li_2O$ in the range of 18 mol $\%<Li_2O\leq30$ mol % is used as the core glass.

When $Li_2O$ concentration of the core glass is less than or equal to 18 mol %, the acceptance angle of the rod lens becomes large, and when $Li_2O$ concentration is more than 30 mol %, the devitrification of glass is too high to form a fiber even if the thermal-interdiffusion by a double crucible is used. It is, therefore, desirable that $Li_2O$ concentration is 18 mol $\%<Li_2O\leq30$ mol %, more preferably 18 mol $\%<Li_2O\leq25$ mol %, or further preferably 20 mol $\%\leq Li_2O\leq25$ mol %.

The concentration of all the alkali metals is preferably less than or equal to 30 mol % in view of the chemical durability for the core glass. Consequently, $Na_2O$ concentration is $\leq12$ mol %, more preferably $\leq10$ mol %, or further preferably 3 mol $\%\leq Na_2O\leq7$ mol %.

It is, therefore, unnecessary that the ratio of $Na_2O$ concentration versus $Li_2O$ concentration is limited to the values from 1.2 to 1.6 as described in Japanese Patent, Publication No.59-41934.

$SiO_2$ is a major component which constitutes the network structure of glass. If $SiO_2$ concentration is less than 40 mol %, the devitrification and chemical durability of the glass are excessively degraded. Also, if $SiO_2$ concentration is more than 65 mol %, the content of modifying oxide for forming a refractive-index distribution is limited and the difference in refractive indices of the rod lens becomes small. As a result, a distributed-index rod lens suitable for practical use may not be obtained, and sometimes the resultant increasing of the melting temperature makes the fiber-forming of glass difficult. Accordingly, $SiO_2$ concentration is preferably 40 mol $\%\leq SiO_2\leq65$ mol %, or more preferably 50 mol $\%\leq SiO_2\leq60$ mol %.

$TiO_2$ is a major component for forming a suitable refractive-index distribution and is an essential component in the glass composition according to the present invention. The content of $TiO_2$ is desirable to be most suitably adjusted according to the content of $Li_2O$ and other components. However, if $TiO_2$ concentration is less than 1 mol %, its effect on the formation of a refractive-index distribution is not enough, and if more than 10 mol %, the devitrification of glass becomes high so that the fiber-formation is made difficult. Particularly, the glass composition of the present invention contains a large quantity of $Li_2O$, then the devitrification of glass tends to be easily caused.

Accordingly, while $TiO_2$ is an essential component, it is desirable to limit the content of $TiO_2$ to the range in which a suitable refractive-index is formed, in view of the devitrification of glass. Therefore, $TiO_2$ concentration is preferably 1 mol $\%\leq TiO_2\leq10$ mol %, more preferably 2 mol $\%\leq TiO_2\leq7$ mol %, or further preferably 3 mol $\%\leq TiO_2\leq6$ mol %.

According to the glass composition described in said Japanese Patent Publication No.59-41934, the refractive-index distribution is provided by the ion-exchange process, so that $TiO_2$ concentration is required to be more than or equal to 2 mol %. It is also described that $TiO_2$ concentration may be up to 16 mol %.

According to the present invention, the refractive-index distribution is provided by the thermal-interdiffusion process, so that the lower limit of $TiO_2$ concentration may be 1 mol %, and the upper limit 10 mol %.

$SiO_2+TiO_2$ are components for forming the network of glass, and are the content thereof is preferably 50 mol $\%\leq(SiO_2+TiO_2)\leq66$ mol %.

MgO and PbO are contained as the modifying oxide for glass, and are superior to other RO oxide in view of making large the difference between the refractive-index in the center of rod lens and that in the peripheral thereof.

MgO, in particular, is an important component for forming a suitable refractive-index distribution, and then is an essential component in the glass composition according to the present invention. When MgO concentration is less than or equal to 8 mol %, the difference in refractive-indices becomes small, and when larger than 18 mol %, a suitable refractive-index distribution may not be obtained.

PbO is not an essential component, but is most superior component in view of improvement of the devitrification of glass without making the difference in refractive-indices small. PbO concentration may be in the range of 0 mol $\%\leq PbO\leq5$ mol %. If PbO concentration is larger than 5 mol %, the chemical durability of glass is degraded.

Therefore, the concentration of MgO+PbO is preferably in the range of 8 mol $\%\leq(MgO+PbO)\leq22$ mol %, or more preferably 10 mol $\%\leq(MgO+PbO)\leq20$ mol %.

According to the present invention, at least one stabilizer selected from the group consisting of 0 mol $\%\leq ZrO_2\leq3$ mol %, 0 mol $\%\leq Sb_2O_3\leq1$ mol %, 0 mol $\%\leq BPO_4\leq4$ mol %, 0 mol $\%\leq Zno\leq3$ mol %, 0 mol $\%\leq La_2O_3\leq3$ mol %, 0 mol $\%\leq Y_2O_3\leq3$ mol %, 0 mol $\%\leq Al_2O_3\leq3$ mol %, and $0\leq As_2O_3\leq1$ mol % can be added to the major components, with the total of the major components being 100 mol %, without degrading the characteristics of the distributed-index rod lens.

It is desirable that the cladding glass used together with the core glass has the same composition as that of the core glass except alkali metals. The cladding glass has a high resistivity for devitrification compared with the core glass, because all of $Li_2O$ is substituted with $R_2O$ ($Na_2O+K_2O$). Also, the cladding glass has the same network structure as that of the core glass, so that thermal-interdiffusion tends to be easily caused, resulting in a refractive-index distribution along the ideal parabolic curve.

Furthermore, the cladding glass has the same density as that of the core glass, because the components of cladding glass and core glass are substantially the same. It is important for the thermal-interdiffusion process using a double crucible that respective densities of core glass and cladding glass are closely approximate. This is due to the fact that if the densities of core glass and cladding glass are different to a large extent, the speeds and amounts of core glass and cladding glass to be pulled from the double crucible are different, so that the control for the fiber-forming becomes difficult, the thermal-diffusion is not successfully operated and then refractive-index distribution along a parabolic curve may not be obtained.

According to the thermal-interdiffusion process using a double crucible, ions are diffused to each other between the core glass and the cladding glass. It is, therefore, desirable that respective numbers (concentrations) of alkali forms in the core glass and the cladding glass are closely approximate.

If the numbers of alkali ions in the core glass and the cladding glass are excessively different, the counterpart ions to be interdiffused therebetween may not exist, so that the thermal-interdiffusion does not successfully proceed.

Therefore, it is desirable that the ratio of the concentration of ($Li_2O+Na_2O$) containing alkali ions in the core glass versus the concentration of ($Na_2O+K_2O$) containing alkali ions in the cladding is in the range of 0.8–1.2.

BRIEF DESCRIPTION OF THE DRAWINGS

The foregoing and other objects, aspects and advantages will be better understood from the following detailed description of preferred embodiments of the invention with reference to the drawings.

DESCRIPTION OF THE EXEMPLARY EMBODIMENT

The present invention will be explained in accordance with the preferred embodiments hereinafter. It should, however, be noted that the present invention is not limited to these embodiments.

First, a thermal-interdiffusion process is discussed with reference to FIG. 3 which shows a schematic cross-section of a fiber-forming furnace 10 using a double crucible.

A pot portion has a double construction comprising an inner pot 11 positioned in center and an outer pot 12 surrounding angularly the outer of the inner pot 11. A core nozzle 13 and a cladding nozzle 14 which forms a double construction with the nozzle 13 are extended from the bottom of the inner pot 11, these pots 11 and 12 being made by platinum.

The cullet for core glass is fed into the inner pot 11 and the cullet for cladding glass the outer pot 12 from a cullet feeder 20, respectively, and then are melted in the pots. These two kinds of molten glass flow downward to be joined at a junction part 16 of the nozzles 11 and 14, resulting in a base glass fiber of core/cladding structure. The molten glass in the pot 11 is preferably homogenized by stirring it by means of a stirrer 22.

Alternatively, the cullet may be melted in another melting pots, and the two kinds of molten glass thus obtained for the core and cladding may be fed into the pots, respectively. It is further desirable that the surface level of molten glass in each pot is maintained constant in order to makes the quantity ratio of the core/the cladding constant.

While the molten core glass and cladding glass flow through a nozzle 15 which is a single nozzle extended from the outer pot 12, $Al^+$ ions contained in the core glass and cladding glass respectively are thermal-interdiffused each other between them, resulting in the refractive ion distribution in the glass.

Figure 3:
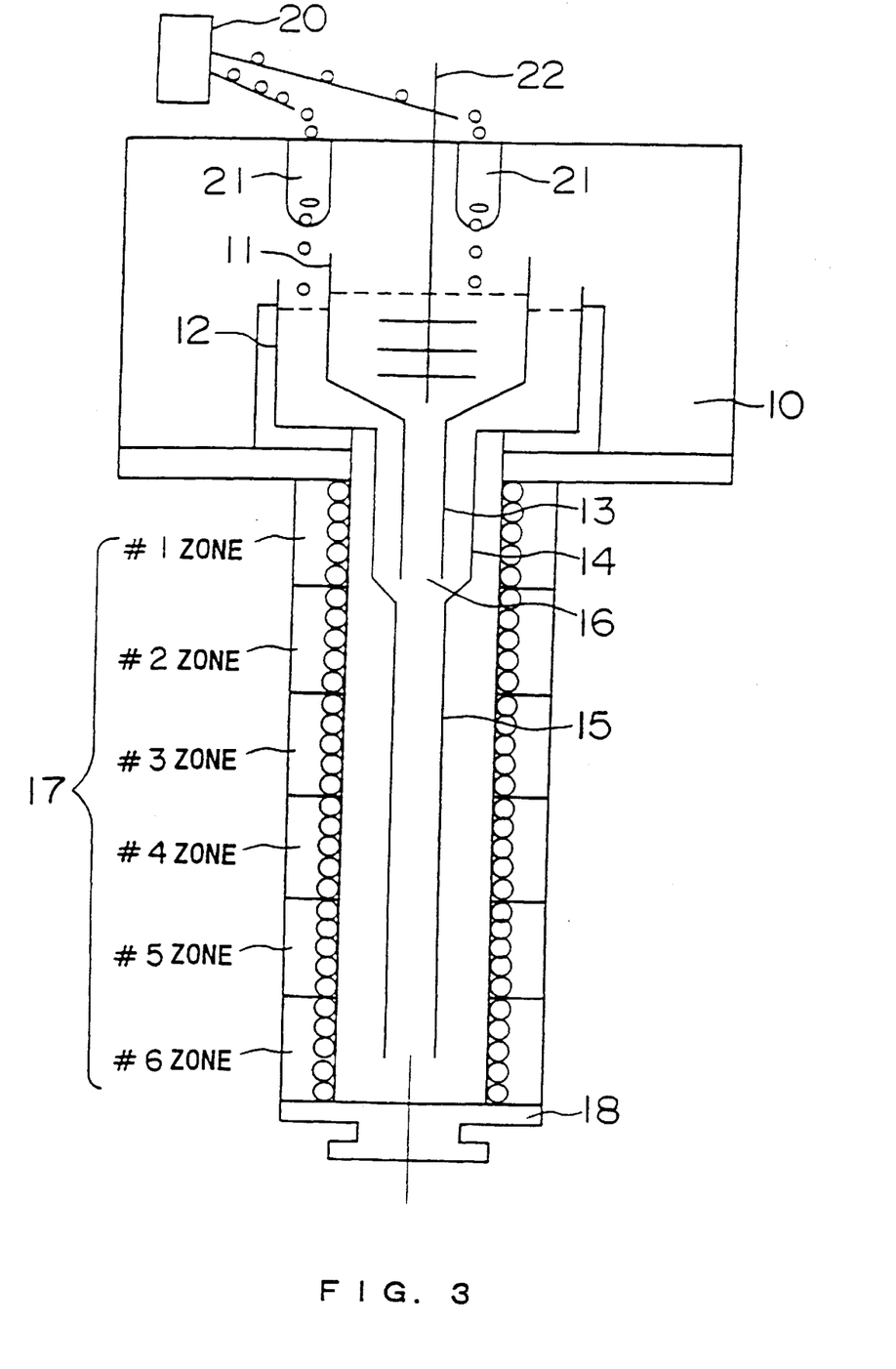
FIG. 3 shows a double crucible used for producing an distributed-index rod lens according to the present invention.

The portion of the double crucible 11, 12, the junction 16 and the nozzles 13, 14, 15 are sectioned into some heater zones 17 (six zones in FIG. 3). By controlling the temperatures in these heater zones 17 respectively, the interdiffusion of $Al^+$ ions may be controlled.

The temperature conditions for the heater zones 17 depend on the composition of glass used, for example, controlled temperatures range from a liquid phase temperature (about 1000° C.) at the pots 11, 12 to an operation temperature (about 600° C.) at the tip of the nozzle 15.

The glass discharged out of the tip of the nozzle 15 passing through the heater zones 17 is pulled at the constant speed by means of pulling rollers (not shown) and is rewound, by a take-up roller (not shown). A diameter measuring device may be provided in the line to measure the diameter of the pulled glass fiber in order to control the amount of cullet or molten glass to be fed and the speed of the take-up roller so that the diameter of the pulled glass fiber is constant.

Distributed-index rod lenses of core/cladding structure may be produced by cutting the pulled glass fiber, i.e., the base glass fiber to the predetermined length.

The measured results for rod lenses thus obtained (samples) are shown in Tables 1–9, which include glass compositions, various characteristics of glass composition, quantity of added stabilizer and acceptance angle.

In Table 1, there is shown major components of glass for core/cladding used for producing the samples (1)–(4). In these samples, the contents (mol %) of $Li_2O$ and $Na_2O$ in particular are caused to be varied, with the total content of the main components being 100 mol %.

TABLE 1

| Sample No. Component (mol %) | (1) Core/Cladding | (2) Core/Cladding | (3) Core/Cladding | (4) Core/Cladding |
|---|---|---|---|---|
| $Li_2O$ | 20/— | 20/— | 25/— | 20/— |
| $Na_2O$ | 5/25 | 5/25 | —/25 | 5/25 |
| PbO | 3/3 | 3/3 | 3/3 | 3/3 |
| MgO | 12/12 | 14/14 | 14/14 | 14/14 |
| BaO | 2/2 | 2/2 | 2/2 | 2/2 |
| $TiO_2$ | 3/3 | 3/3 | 3/3 | 3/3 |
| $SiO_2$ | 55/55 | 53/53 | 53/53 | 53/53 |
| Total | 100/100 | 100/100 | 100/100 | 100/100 |

The quantity of stabilizers added into the glass for core/cladding used for producing said samples (1)–(4) is shown in Table 2.

TABLE 2

| Sample No.<br>Component<br>(mol %) | (1)<br>Core/Cladding | (2)<br>Core/Cladding | (3)<br>Core/Cladding | (4)<br>Core/Cladding |
|---|---|---|---|---|
| Stabilizer | | | | |
| $ZrO_2$ | 0.5/0.5 | 0.5/0.5 | 0.5/0.5 | 0.5/0.5 |
| $Sb_2O_3$ | 0.3/0.3 | 0.3/0.3 | 0.3/0.3 | 0.3/0.3 |
| $BPO_4$ | 2/2 | 2/2 | 2/2 | 2/2 |

It should be noted that the content of stabilizers is designated in mol % with respect to the total 100 mol % of said major components.

In Table 3, there is shown various characteristics of the core glass and cladding glass for the samples (1)–(4). Nd is a refractive index, D is a density, Tg is a transformation temperature, At is a glass softening temperature and α is an expansion coefficient in the Table.

TABLE 3

| | Sample No. | | | |
|---|---|---|---|---|
| Characteristic | (1)<br>Core/<br>Cladding | (2)<br>Core/<br>Cladding | (3)<br>Core/<br>Cladding | (4)<br>Core/<br>Cladding |
| Nd | 1.598/1.566 | 1.599/1.566 | 1.613/1.566 | 1.601/1.566 |
| D (g/cm$^3$) | 2.85/2.85 | 2.84/2.87 | 2.91/2.89 | 2.87/2.87 |
| Tg (° C.) | 447/452 | 485/500 | 470/499 | 446/501 |
| At (° C.) | 497/508 | 445/541 | 500/539 | 490/542 |
| α<br>(× 10$^{-7}$) | 116/132 | 123/136 | 111/135 | 120/137 |

In Tables 4 and 5, there are shown the measured results of a diameter (mm), a core ratio (%) and an acceptance angle (degree) for a plurality of samples with respect to said each samples (1)–(4), said plurality of samples being produced with fiber-forming conditions varied. The acceptance angles measured herein depends upon such assumptions that the cladding part of rod lens also contributes to the convergence of light and thus the total of glass including both core glass and cladding glass constitutes a lens. The core ratio means the ratio of the radius of core part versus that of rod lens. It is understood from Tables 4 and 5 that the maximum acceptance angle obtained is 25.3 degrees (see the samples No. (3–10) in Table 5).

TABLE 4

| Sample No. | Radius (mm) | Core ratio (%) | Acceptance Angle (degree) |
|---|---|---|---|
| (1-1) | 0.25 | 70 | 18.4 |
| (1-2) | 0.25 | 70 | 21.3 |
| (1-3) | 0.25 | 70 | 19.8 |
| (1-4) | 0.25 | 70 | 19.2 |
| (1-5) | 0.25 | 70 | 20.7 |
| (2-1) | 0.25 | 63 | 20.3 |
| (2-2) | 0.25 | 68 | 19.0 |
| (2-3) | 0.25 | 64 | 18.8 |
| (2-4) | 0.25 | 59 | 19.9 |
| (2-5) | 0.25 | 67 | 18.9 |
| (2-6) | 0.25 | 68 | 18.8 |

TABLE 4-continued

| Sample No. | Radius (mm) | Core ratio (%) | Acceptance Angle (degree) |
|---|---|---|---|
| (2-7) | 0.25 | 66 | 20.3 |
| (2-8) | 0.25 | 66 | 20.3 |
| (2-9) | 0.25 | 67 | 21.4 |
| (2-10) | 0.25 | 62 | 20.2 |
| (2-11) | 0.25 | 70 | 18.1 |
| (2-12) | 0.25 | 70 | 17.3 |

TABLE 5

| Sample No. | Radius (mm) | Core ratio (%) | Acceptance Angle (degree) |
|---|---|---|---|
| (3-1) | 0.25 | 77 | 19.1 |
| (3-2) | 0.25 | 65 | 23.3 |
| (3-3) | 0.25 | 70 | 22.5 |
| (3-4) | 0.25 | 71 | 21.3 |
| (3-5) | 0.25 | 74 | 22.8 |
| (3-6) | 0.25 | 72 | 22.3 |
| (3-7) | 0.25 | 72 | 21.8 |
| (3-8) | 0.25 | 66 | 23.6 |
| (3-9) | 0.25 | — | 22.5 |
| (3-10) | 0.25 | 70 | 25.3 |
| (3-11) | 0.25 | 63 | 24.3 |
| (4-1) | 0.25 | 68 | 19.8 |
| (4-2) | 0.25 | 70 | 19.5 |
| (4-3) | 0.25 | 70 | 20.8 |
| (4-4) | 0.25 | 70 | 19.4 |
| (4-5) | 0.25 | 73 | 18.6 |
| (4-6) | 0.25 | 73 | 19.3 |
| (4-7) | 0.25 | 70 | 19.1 |
| (4-8) | 0.25 | 68 | 19.1 |

In Table 6, there is shown major components of glass for core/cladding used for comparative samples (5)–(8) of a distributed-index rod lens in order to make a comparison with said measured results for acceptance angles shown in Tables 4 and 5.

TABLE 6

| Sample No.<br>Component<br>(mol %) | (5)<br>Core/Cladding | (6)<br>Core/Cladding | (7)<br>Core/Cladding | (8)<br>Core/Cladding |
|---|---|---|---|---|
| $Li_2O$ | 9/— | 10.5/— | 12/— | 31/— |
| $Na_2O$ | 13.5/22.5 | 9/23 | 10.5/23 | —/31 |
| PbO | 2/2 | 2.5/2 | 2/2 | 3/3 |
| MgO | 10/9.5 | 11/9.5 | 9.5/9.5 | 12/12 |
| BaO | 2/2 | 2/2 | 2/2 | 2/2 |
| $TiO_2$ | 5.5/5 | 5/5 | 5/5 | 3/3 |
| $SiO_2$ | 58/59 | 60/58.5 | 59/58.5 | 49/49 |
| Total | 100/100 | 100/100 | 100/100 | 100/100 |

In addition to Table 6, Table 7 shows the quantity of stabilizers added into the core glass and cladding glass used for producing the comparative samples (5)–(8).

TABLE 7

| Sample No.<br>Component<br>(mol %) | (5)<br>Core/Cladding | (6)<br>Core/Cladding | (7)<br>Core/Cladding | (8)<br>Core/Cladding |
|---|---|---|---|---|
| Stabilizer | | | | |
| $ZrO_2$ | 0.5/0.5 | 0.5/0.5 | 0.5/0.5 | 0.5/0.5 |
| $Sb_2O_3$ | 0.3/0.3 | 0.3/0.3 | 0.3/0.3 | 0.3/0.3 |
| $BPO_4$ | —/— | —/— | —/— | 2/2 |

The measured results of a diameter, a core ratio and an acceptance angle for a plurality of samples included in said each comparative samples (5)–(8) are shown in Tables 8 and 9.

TABLE 8

| Sample No. | Radius (mm) | Core ratio (%) | Acceptance Angle (degree) |
|---|---|---|---|
| (5-1) | 0.13 | 72 | 10.4 |
| (5-2) | 0.13 | 68 | 9.6 |
| (5-3) | 0.13 | 74 | 13.0 |
| (5-4) | 0.13 | 70 | 10.6 |
| (5-5) | 0.13 | 73 | 12.0 |
| (6-1) | 0.13 | 73 | 12.6 |
| (6-2) | 0.25 | 70 | 14.6 |
| (6-3) | 0.52 | 74 | 8.5 |
| (6-4) | 0.54 | 72 | 12.2 |
| (6-5) | 0.82 | 72 | 11.8 |
| (6-6) | 0.55 | 71 | 15.5 |
| (6-7) | 0.72 | 73 | 14.7 |
| (6-8) | 0.68 | 71 | 15.1 |
| (6-9) | 0.75 | 68 | 15.5 |

TABLE 9

| Sample No. | Radius (mm) | Core ratio (%) | Acceptance Angle (degree) |
|---|---|---|---|
| (7-1) | 0.51 | 72 | 13.0 |
| (7-2) | 0.52 | 76 | 12.3 |
| (7-3) | 0.50 | 78 | 12.0 |
| (7-4) | 0.52 | 73 | 14.8 |
| (7-5) | 0.58 | 70 | 12.9 |
| (7-6) | 0.50 | 78 | 12.8 |
| (7-7) | 0.54 | 74 | 13.8 |
| (7-8) | 0.51 | 72 | 14.8 |
| (8- | — | — | Devitrification |

According to Table 9, it is understood that the comparative sample of No.8 containing 31 mol % of $Li_2O$ in the glass composition for core is devitrified. It is also appreciated that an acceptance angle can not become large if the content of $Li_2O$ in the glass composition for core is less than or equal to 18 mol %.

Figure 4:
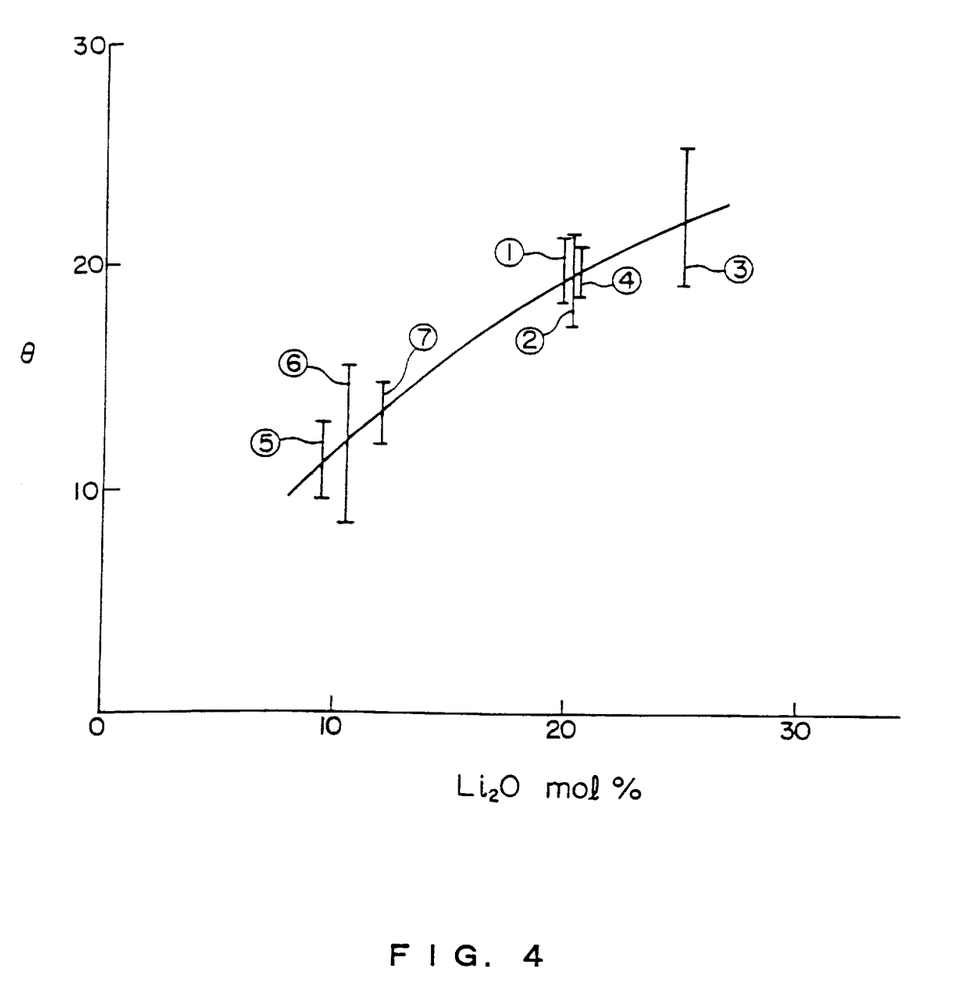
FIG. 4 shows a bar graph designating a relationship between the content of $Li_2O$ and an acceptance angle.

In FIG. 4, there is shown the bar graph illustrating a relationship between $Li_2O$ content and an acceptance angle θ. The abscissa designates the content (mol %) of $Li_2O$ and the ordinate the acceptance angle θ. The bars 1–4 show the distributions of acceptance angles for the samples (1)–(4), and the bars 5–7 shows that for the comparative samples (5)–(7).

According to the bar graph in FIG. 4, it is understood that the acceptance angle θ increases nearly in proportion to the content of $Li_2O$. Japanese Patent Publication No. 59-41934 discloses that the difference in refractive indices do not necessarily increase linearly, even if the content (or concentration) of $Li_2O$ increases. Such tendency, however, is not appeared in the rod lens according to the present invention in which the refractive index distribution is provided by the thermal-interdiffusion.

Figure 5A:
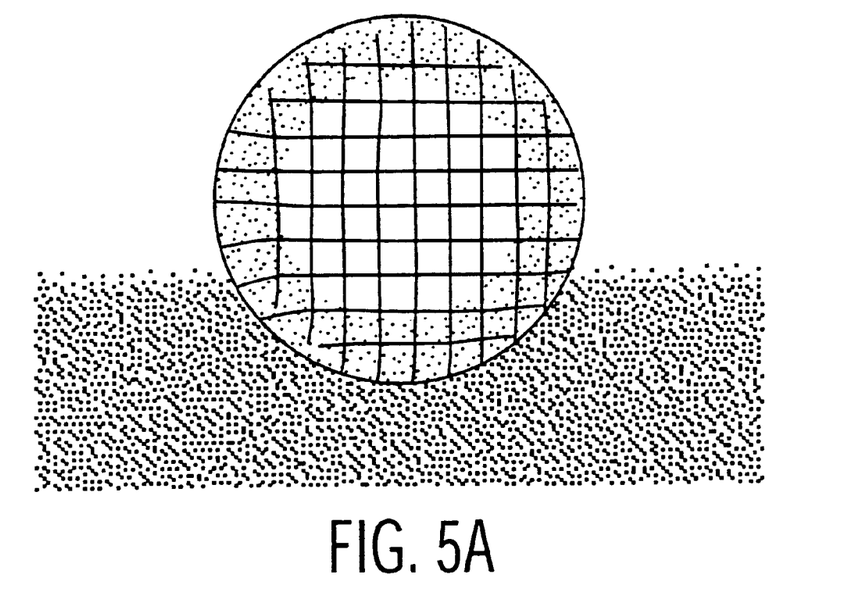
FIGS. 5A and 5B show a photograph of a grid pattern being imaged by a rod lens of the present invention and a traced drawing of a part of lens.
Figure 5B:
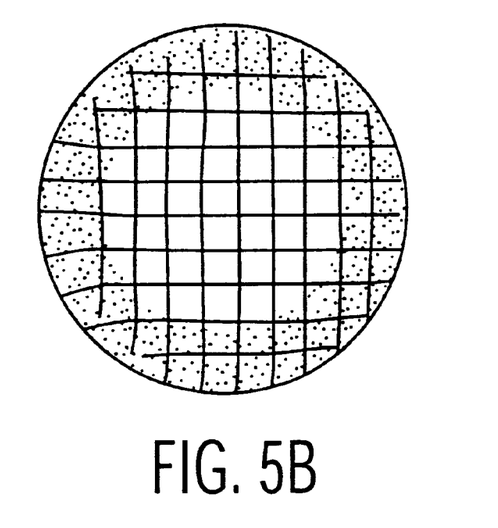

In FIGS. 5A and 5B, there are shown a photograph of an image of grid pattern formed by the distributed-index rod lens according to the present invention, and a traced drawing of a part of the lens. It is understood from these figures that the grid pattern is clearly imaged in the core excepting the cladding, as a result of which a rod lens having a high quality can be obtained.

While the embodiments have been explained in accordance with distributed-index rod lenses, it is apparent that the present invention can be applied to distributed-index fibers.

According to the present invention, as described above, the glass compositions suitable for producing core/cladding type of distributed-index optical elements may be obtained. Furthermore, using these glass compositions, distributed-index rod lenses or fibers having a small chromatic aberration, a large acceptance angle and a high durability can be produced.

Furthermore, according to the glass compositions of the present invention, it is unnecessary to contain a large quantity of $TiO_2$ as described in Japanese Patent Publication No.59-41934, which is useful for avoiding the devitrification of glass.

While the invention has been described in terrns of preferred embodiments, those skilled in the art will recognize that the invention can be practiced with modification within the spirit and scope of the appended claims.

We claim:

1. Glass compositions for a core/cladding distributed-index optical element produced by a thermal-interdiffusion process using a double crucible, said glass compositions comprising:

a glass composition for the core containing 18 mol %$<Li_2O \leq$30 mol %, 0 mol %$\leq Na_2O \leq$12 mol %, 0 mol %$\leq PbO \leq$5 mol %, 8 mol %$\leq MgO \leq$18 mol %, 0.5 mol %$\leq BaO \leq$5 mol %, 1 mol %$\leq TiO_2 \leq$10 mol %, and 40 mol %$\leq SiO_2 \leq$65 mol % as major components, where 18 mol % $<(Li_2O+Na_2O) \leq$30 mol %, 50 mol %$\leq (SiO_2+TiO_2) \leq$66 mol %, and 8 mol %$\leq (MgO+PbO) \leq$22 mol %; and a glass composition for the cladding containing 18 mol % $<R_2O \leq$30 mol % $(R_2O=Na_2O+K_2O)$, 0 mol %$\leq PbO \leq$5 mol %, 8 mol %$\leq MgO \leq$18 mol %, 0.5 mol %$\leq BaO \leq$5 mol %, 1 mol %$\leq TiO_2 \leq$10 mol %, and 40 mol %$\leq SiO_2 \leq$65 mol % as major components, where 50 mol %$\leq (SiO_2+TiO_2) \leq$66 mol %, and 8 mol %$\leq (MgO+PbO) \leq$22 mol %.

2. Glass compositions of claim 1, wherein each of said glass compositions for core and cladding additionally contains at least one stabilizer selected from the group consisting of 0 mol %$\leq ZrO_2 \leq$3 mol %, 0 mol %$\leq Sb_2O_3 \leq$1 mol %, 0 mol %$\leq BPO_4 \leq$4 mol %, 0 mol %$\leq ZnO \leq$3 mol %, 0 mol %$\leq La_2O_3 \leq$3 mol %, 0 mol %$\leq Y_2O_3 \leq$3 mol %, 0 mol %$\leq Al_2O_3 \leq$3 mol %, and 0 mol %$\leq As_2O_3 \leq$1 mol %, with the total of said major components being 100 mol %.

3. Glass compositions of claim 1 or 2, wherein the ratio of the concentration of said component $(Li_2O+Na_2O)$ versus that of said component $(Na_2O+K_2O)$ is in the range of 0.8–1.2.

4. A core/cladding distributed-index optical element produced by a thermal-interdiffusion process using a double crucible from a glass composition for the core and a glass composition for the cladding, wherein:

said glass composition for the core contains 18 mol %$<Li_2O \leq$30 mol %, 0 mol %$\leq Na_2O \leq$12 mol %, 0 mol % $PbO \leq$5 mol %, 8 mol %$\leq MgO \leq$18 mol %, 0.5 mol %$\leq BaO \leq$5 mol %, 1 mol %$\leq TiO_2 \leq$10 mol %, and 40 mol %$\leq SiO_2 \leq$65 mol % as major components, where 18 mol %$<(LiO_2+Na_2O) \leq$30 mol %, 50 mol %$\leq (SiO_2+TiO_2) \leq$66 mol %, and 8 mol %$\leq (MgO+PbO) \leq$22 mol %;

said glass composition for the cladding contains 18 mol % $\leq R_2O \leq$30 mol % $(R_2O=Na_2O+K_2O)$, 0 mol %$\leq PbO \leq$5 mol %, 8 mol %$\leq MgO$, 18 mol %, 0.5 mol %$\leq BaO \leq$5 mol %, 1 mol %$\leq TiO_2 \leq$10 mol %, and 40 mol % $SiO_2 \leq$65 mol % as major components, where 50 mol %$\leq (SiO_2+TiO_2) \leq$66 mol %, and 8 mol %$\leq (MgO+PbO) \leq$22 mol %.

5. A core/cladding distributed-index optical element of claim 4, wherein each of said glass compositions for the core and the cladding additionally contains at least one stabilizer selected from the group consisting of 0 mol %$\leq ZrO_2 \leq$3 mol %, 0 mol %$\leq Sb_2O_3 \leq$1 mol %, 0 mol %$\leq BPO_4 \leq$4 mol %, 0 mol %$\leq ZnO \leq$3 mol %, 0 mol %$\leq La_2O_3 \leq$3 mol %, 0 mol %$\leq Y_2O_3 \leq$3 mol %, 0 mol %$\leq Al_2O_3 \leq$3 mol %, and 0 mol %$\leq As_2O_3 \leq$1 mol %, with the total of said major components being 100 mol %.

6. A core/cladding distributed-index optical element of claim 4 or 5, wherein the ratio of the concentration of said component $(Li_2O+Na_2O)$ versus that said component $(Na_2O+K_2O)$ is in the range of 0.8–1.2.

7. A method for producing a core/cladding distributed-index optical element using a thermal-interdiffusion process, comprising the steps of:

feeding a glass composition for the core into an inner pot of a double crucible;

feeding a glass composition for the cladding into an outer pot of said double crucible; and forming a core/cladding structure at a junction of said inner pot and outer pot;

wherein said glass composition for the core contains 18 mol %$\leq Li_2O \leq$30 mol %, 0 mol %$\leq Na_2O \leq$12 mol %, 0 mol %$\leq PbO \leq$5 mol %, 8 mol %$\leq MgO \leq$18 mol %, 0.5 mol %$\leq BaO \leq$5 mol %, 1 mol %$\leq TiO_2 \leq$10 mol %, and 40 mol %$\leq SiO_2 \leq$65 mol % as major components, where 18 mol %$\leq (Li_2O+Na_2O) \leq$30 mol %, 50 mol %$(SiO_2+TiO_2) \leq$66 mol %, and 8 mol %$\leq (MgO+PbO) \leq$22 mol % and said glass composition for the cladding contains 18 mol %$<R_2O \leq$30 mol % $(R_2O=Na_2O+K_2O)$, 0 mol %$\leq PbO \leq$5 mol %, 8 mol %$\leq MgO \leq$18 mol %, 0.5 mol %$\leq BaO \leq$5 mol %, 1 mol %$\leq TiO_2 \leq$10 mol %, and 40 mol %$\leq SiO_2 \leq$65 mol % as major components, where 50 mol %$\leq (SiO_2+TiO_2) \leq$66 mol %, and 8 mol %$\leq (MgO+PbO) \leq$22 mol %.

8. A glass composition for a core/cladding distributed-index optical element produced by a thermal-interdiffusion using a double crucible, said glass composition comprising:

18 mol %$<Li_2O \leq$30 mol %, 0 mol %$\leq Na_2O \leq$12 mol %, 0 mol %$\leq PbO \leq$5 mol %, 8 mol %$\leq MgO \leq$18 mol %, 0.5 mol %$\leq BaO \leq$5 mol %, 1 mol %$\leq TiO_2 \leq$10 mol %, and 40 mol %$\leq SiO_2 \leq$65 mol % as major components, where 18 mol %$\leq (Li_2O+Na_2O) \leq$30 mol %, 50 mol %$\leq (SiO_2+TiO_2) \leq$66 mol %, and 8 mol %$\leq (MgO+PbO) \leq$22 mol %.

9. A glass composition of claim 8, wherein said glass composition additionally contains at least one stabilizer selected from the group consisting of 0 mol %$\leq ZrO_2 \leq$3 mol %, 0 mol %$\leq Sb_2O_3 \leq$1 mol %, 0 mol %$\leq BPO_4 \leq$4 mol %, 0 mol %$\leq ZnO \leq$3 mol %, 0 mol %$\leq La_2O_3 \leq$3 mol %, 0 mol %$\leq Y_2O_3 \leq$3 mol %, 0 mol %$\leq Al_2O_3 \leq$3 mol %, and 0 mol %$\leq As_2O_3 \leq$1 mol %, with the total of said major components being 100 mol %.

* * * * *